US008523371B2

(12) United States Patent
Sakata

(10) Patent No.: US 8,523,371 B2
(45) Date of Patent: Sep. 3, 2013

(54) VEHICLE OUTSIDE MIRROR DEVICE

(75) Inventor: Ikuo Sakata, Isehara (JP)

(73) Assignee: Ichikoh Industries, Ltd., Isehara-shi (JP)

( * ) Notice: Subject to any disclaimer, the term of this patent is extended or adjusted under 35 U.S.C. 154(b) by 359 days.

(21) Appl. No.: 13/048,246

(22) Filed: Mar. 15, 2011

(65) Prior Publication Data

US 2011/0235200 A1 Sep. 29, 2011

(30) Foreign Application Priority Data

Mar. 26, 2010 (JP) ................................. 2010-071463

(51) Int. Cl.
*G02B 7/182* (2006.01)
(52) U.S. Cl.
USPC .......................................................... 359/875
(58) Field of Classification Search
USPC ......................................... 359/844, 871–877
See application file for complete search history.

(56) References Cited

U.S. PATENT DOCUMENTS

| 2004/0264015 | A1 | 12/2004 | Hsu |
| 2008/0149803 | A1 | 6/2008 | Yoshida et al. |
| 2009/0229962 | A1 | 9/2009 | Brouwer et al. |
| 2013/0083412 | A1* | 4/2013 | Sakata ........................ 359/841 |

FOREIGN PATENT DOCUMENTS

JP 2001-287594 A 10/2001

* cited by examiner

*Primary Examiner* — Jennifer L. Doak
(74) *Attorney, Agent, or Firm* — Foley & Lardner LLP

(57) ABSTRACT

In a conventional vehicle outside mirror device, there has been a problem that a frictional wear occurs. According to the present invention, an interposing member 6 is provided between a shaft holder 9 and a gear case 11. An electrically rotation range restricting mechanism is a mechanism in which an electrically driven rotation range of a mirror assembly 4 is restricted, and is comprised of abutment faces 33, 34, 43, 44 which are provided at the interposing member 6 and the shaft holder 9. A buffering mechanism is a mechanism which causes the mirror assembly 4 to rotate for the sake of buffering, and is comprised of engagement portions 38, 45 which are provided at the interposing member 6 and the gear case 11. The electrically driven rotation range restricting mechanism and the buffering mechanism are separated from each other. As a result, the present invention can prevent a frictional wear from occurring between the interposing member 6 and the shaft holder 9 and between the interposing member 6 and the gear case 11.

2 Claims, 14 Drawing Sheets

VEHICLE OUTSIDE MIRROR DEVICE

CROSS REFERENCE TO RELATED APPLICATIONS

This application claims priority of Japanese Patent Application No. 2010-071463 filed on Mar. 26, 2010. The contents of this application are incorporated herein by reference in their entirety.

BACKGROUND OF THE INVENTION

1. Field of the Invention

The present invention relates to a vehicle outside mirror device enabling a mirror assembly to be mounted to enable rotation (tilting or turning) on a vehicle body via an electrically driven storage unit and a base. In other words, the present invention relates to a vehicle outside mirror device such as an electrically storage type door mirror, for example.

2. Description of the Related Art

A vehicle outside mirror of such type is conventionally known (for example, Japanese Patent Application Laid-open No. 2001-287594). Hereinafter, a conventional vehicle outside mirror device will be described. In the conventional vehicle outside mirror device, a storage mechanism causes a case to rotate relative to a stand and then a case top and a stand top engages with each other, whereby a mirror is positioned in an erected location and a storage location, and in a case where the case is subjected to an external force of a predetermined value or more applied to a forward tilting enable location of the mirror, the case top runs on the stand top and then rotation in the forward tilting enable location of the mirror is allowed for.

However, in the conventional vehicle outside mirror device described previously, an electrically driven rotation range restricting mechanism, for positioning the mirror in the erected location and the storage location, and a buffering mechanism causing the mirror to rotate in the front tilting enable location are comprised of the case top and the stand top, in other words, the same constituent elements. Therefore, in the conventional vehicle outside mirror device, when the case top of the case comprised of a member with its high rigidity runs on a stand top of the stand comprised of a member with its high rigidity, similarly, at least either one of the case top and the stand top is covered with a cutting proof member comprised of a member with its high rigidity in order to prevent the case top and the stand top from frictional wear (cutting loss).

As a result, in the conventional outside mirror device, a frictional wear occurs between the cutting proof member, with which the case top is covered, and the stand top; between the cutting proof member, with which the stand top is covered, and the case top; or between the cutting proof member, with which the case top is covered, and the cutting proof member, with which the stand top is covered. In other words, while no frictional wear occurs in at least either one of the case top and the stand top which are covered with which the cutting proof member, a frictional wear occurs in the case top or the stand top which is not covered with the cutting proof member and in the cutting proof member with which at least either one of the case top and the stand top is covered.

In the conventional vehicle outside mirror, there has been a problem that a frictional wear occurs between the cutting proof member, with which the case top is covered, and the stand top; between the cutting proof member, with which the stand top is covered, and the case top; or between the cutting proof member, with which the case top is covered, and the cutting proof member, with which the stand top is covered. The present invention has been made to solve the above-described problem.

SUMMARY OF THE INVENTION

A first aspect of the present invention is characterized in that: an interposing member is provided between a shaft holder and a casing;

an electrically driven rotation range restricting mechanism is comprised of: an abutment face which is provided at a respective one of the interposing member and the shaft holder; and an abutment face of the interposing member and an abutment face of the shaft holder abut against each other, whereby the interposing member is fixed to the shaft holder and the electrically driven rotation range of the mirror assembly is restricted;

a buffering mechanism is comprised of an engagement portion which is provided at a respective one of the interposing member and the casing, the buffering mechanism serving as a mechanism in which, with the electrically driven rotation force (which serves as a force causing a mirror assembly to rotate relative to a shaft in an electrically driven rotation range and which serves as an electrically driven torque), an engagement portion of the interposing member and an engagement portion of the casing are disallowed to disengage from each other, the interposing member and the casing rotating together relative to the shaft and the shaft holder in the electrically driven rotation range, and with a force which is equal to or greater than the electrically driven rotation force, the engagement portion of the interposing member and the engagement portion of the casing disengage from each other, and further, the clutch mechanism is disengaged for the casing to rotate relative to the shaft and the shaft holder.

A second aspect of the present invention is characterized in that the interposing member is comprised of a member with its low friction and frictional wear proof property.

In the vehicle outside mirror device according to the first aspect of the present invention, an electrically driven rotation range restricting mechanism for restricting a range of a mirror assembly and a buffering mechanism causing the mirror assembly to rotate for the sake of buffering are configured separately from each other. In other words, the electrically driven rotation range restricting mechanism is comprised of an interposing member and a shaft holder, whereas the buffering mechanism is comprised of an interposing member and a casing. Therefore, with the vehicle outside mirror device according to the first aspect of the present invention, in an electrically driven rotation range, the interposing member and the casing rotate together relative to the shaft holder, and when a force which is equal to or greater than the electrically driven rotation force has acted thereon, the casing rotates relative to the interposing member and the shaft holder for the sake of buffering. As a result, in the vehicle outside mirror device according to the first aspect of the present invention, the interposing member is interposed between the shaft holder and the casing and rotates relative to the shaft holder or relative to the casing, so that the interposing member can be comprised of an inexpensive member with its low friction and frictional wear proof property without a need to be comprised of a member with its high rigidity, whereas the shaft holder and the casing can be comprised of a member with its high rigidity.

In addition, in the vehicle outside mirror device according to the first aspect of the present invention, an interposing member rotates relative to the shaft holder in an interrelationship between the interposing member and the shaft holder and the interposing member is fixed to the shaft holder by means of abutment (facial abutment) between an abutment face of the interposing member and an abutment face of the shaft holder; and therefore, unlike the conventional vehicle outside mirror device described previously, at the time of rotation in a forward tilting enable location, a cutting proof member with which a case top is covered is disallowed to run on a stand top. In other words, when a mirror assembly rotates for the sake of buffering, the interposing member does not rotate relative to the shaft holder; a buffering rotation force (which serves as a force of disengaging an engagement portion of the interposing member and an engagement portion of the casing from each other and which serves as a buffering torque) is disallowed to act between the interposing member and the shaft holder; and a material for the shaft holder and the shaft is disallowed to affect durability of a rotation force at the time of buffering. Therefore, in the vehicle outside mirror device according to the first aspect of the present invention, no frictional wear occurs between the interposing member and the shaft holder, so that the shaft holder and the shaft can be comprised of a resin member with its high rigidity or a metal member and a material type can be selectively employed in accordance with a request for a vehicle type. In other words, as a material for the shaft holder and the shaft, a resin member with its low cost and high rigidity can be selected in the case of a small-sized vehicle outside mirror device or a metal material can be selected in the case of a large-sized vehicle outside mirror device such as an RV vehicle. On the other hand, parts other than the shaft holder and the shaft, i.e., the interposing member and the casing can be shared. As a result, support for a request for a vehicle type can be achieved and manufacturing cost can be reduced.

Moreover, in the vehicle outside mirror device according to the first aspect of the present invention, the electrically driven rotation range of the mirror assembly can be adjusted and set for each vehicle type by changing an opening angle of an abutment face of a shaft holder of an electrically driven rotation restricting mechanism. As a result, in the vehicle outside mirror device according to the first aspect of the present invention, parts other than the shaft holder and the shaft, i.e., the interposing member and the casing can be shared, so that support for a request for a vehicle type can be achieved and manufacturing cost can be reduced.

Further, in the vehicle outside mirror device according to the first aspect of the present invention, the engagement portion of the interposing member and the engagement portion of the casing, of the buffering mechanism, engage with each other, and the abutment face of the interposing member and the abutment face of the shaft holder, of the electrically driven rotation range restricting mechanism, abut against each other, so that the casing can be assembled with the shaft holder via the interposing member without any backlash, whereby movement of a mirror of a minor assembly can be reduced to its required minimum.

In addition, in the vehicle outside minor device according to the second aspect of the present invention, an interposing member is comprised of a member with its low friction and frictional wear proof property, so that a rotation (slipping, sliding, or sliding movement) between the interposing member and a shaft holder and a rotation (slipping, sliding, or sliding movement) between the interposing member and a casing become smooth and stable. As a result, in the vehicle outside mirror device according to the second aspect of the present invention, distortion of an electrically driven rotation force and a buffering rotation force lessens, so that a design strength of parts of an electrically driven storage unit can be reduced. For example, the thickness is reduced or a material grade can be degraded, and the manufacturing cost of the entire electrically driven storage unit can be reduced.

Further, in the vehicle outside mirror device according to the second aspect of the present invention, an interposing member is comprised of a material with its low friction and frictional wear proof property, so that a frictional wear between the engagement portion of the interposing member and the engagement portion of the casing can be restrained to its required minimum. As a result, the vehicle outside minor device according to the second aspect of the present invention can restrain the lowering of a buffering rotation force and can thereby prevent a failure that a mirror assembly tilts more forwardly than a use location due to the lowering of the buffering rotation force.

Moreover, in the vehicle outside mirror device according to the first aspect of the present invention, an interposing member is comprised of a member with its low friction and frictional wear proof property, so that even if a lubricating member such as grease applied to the interposing member, a shaft holder, and a casing in order to take countermeasure against a frictional wear becomes short with an elapse of time (even at the time of lack of grease), frictional coefficients of the interposing member, the shaft holder, and the casing less change, so that even after extended use thereof, the performance of a buffering rotation force is less degraded.

DESCRIPTION OF THE PREFERRED EMBODIMENTS

Hereinafter, an exemplary embodiment of a vehicle outside mirror device according to the present invention will be described with reference to the drawings. It should be noted that these exemplary embodiments do not limit the present invention.

[Exemplary Embodiment]

(Description of Configuration)

Figure 1:
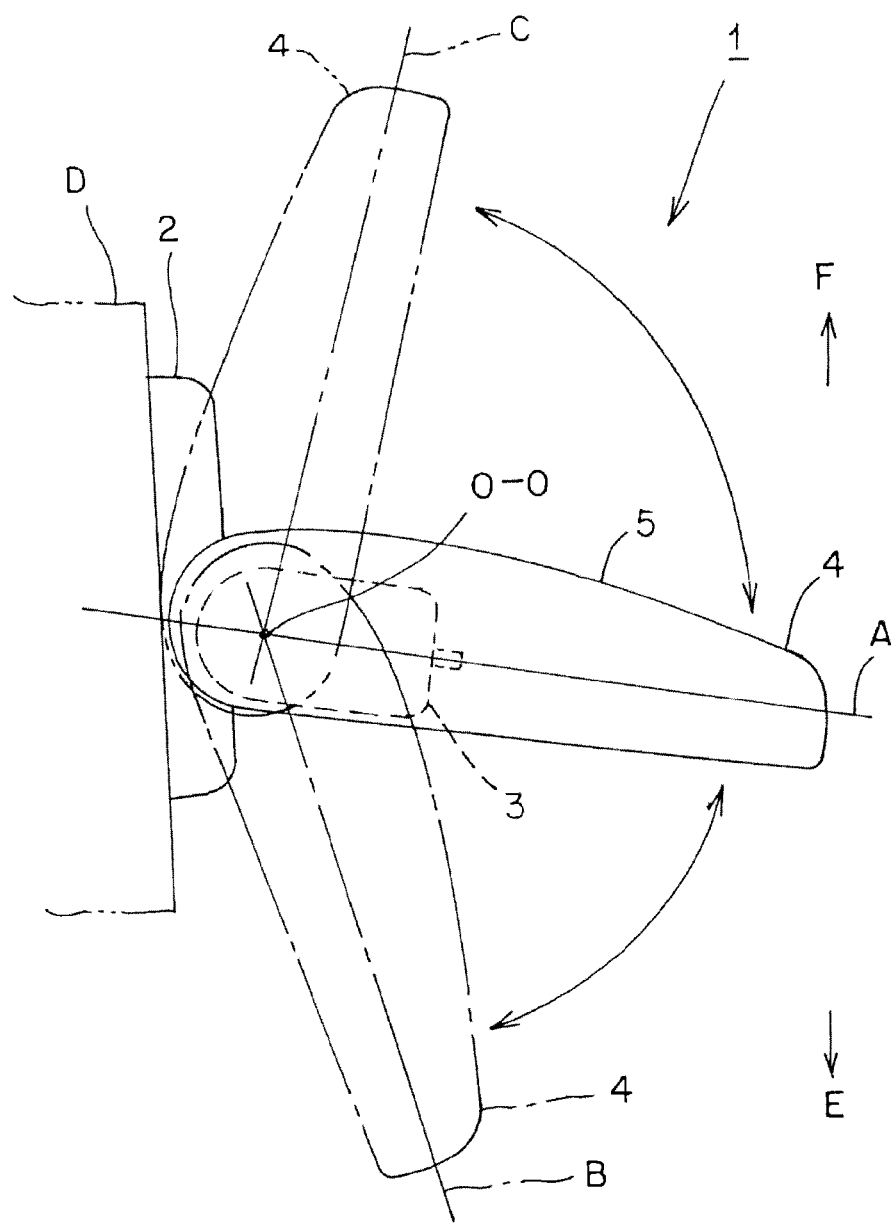
FIG. 1 is a plan view of a use state showing an exemplary embodiment of a vehicle outside minor device according to the present invention.

Hereinafter, a configuration of the vehicle outside mirror device in the exemplary embodiment will be described. In FIG. 1, reference numeral 1 designates the vehicle outside mirror device in the exemplary embodiment. In this example, an electrically storage type door mirror device (an electrically driven storage type door mirror) is provided. The electrically driven storage type door mirror 1 is equipped at a respective one of the left and right doors of an automobile. The electrically driven storage type door mirror 1 of the exemplary embodiment is equipped at the right side door of the automobile, and an electrically driven storage type door mirror device equipped at the left side door of the automobile is reversed at the left and right from the electrically driven storage type door mirror device 1 of the exemplary embodiment.

In the electrically driven storage type door mirror device 1, as shown in FIG. 1, a mirror assembly 4 is the one that is rotatably mounted on a vehicle body (an automobile door) D via an electrically driven storage unit 3 and a base (a mirror base) 2. The base 2 is the one that is fixed to the door D.

The mirror assembly 4 is comprised of: a mirror housing 5; a mount bracket (not shown); a power unit (not shown); and a mirror (a mirror unit), although not shown. The mount bracket is mounted in the mirror housing 5. The power unit is mounted on the mount bracket. On the power unit, the mirror is mounted to be able to tilt vertically and horizontally.

The electrically driven storage unit 3 is provided with: a shaft holder 9; a shaft 10; a gear case 11 and a cover 12, a respective one of which serves as a casing; a motor 13; a deceleration mechanism 14 and a clutch mechanism 15, each of which serves as a rotation force transmission mechanism; a bearing member 16; an interposing member 6; an electrically driven rotation range restricting mechanism; and a buffering mechanism.

The shaft holder 9 is fixed to the base 2. The shaft 10 is integrally provided at a center of one face (a top face) of the shaft holder 9. The shaft 10 is formed in a hollow shape, and is configured so that a harness (not shown) is inserted through the shaft. On the shaft 10, the gear case 11 and the cover 12 are rotatably mounted around a rotational center O-O of the shaft 10. The mount bracket of the mirror assembly 4 is mounted on the gear case 11. In the gear case 11 and the cover 12, there are housed: the motor 13; the deceleration mechanism 14 and the clutch mechanism 15, a respective one of which serves as the rotation force transmission mechanism; the bearing member 16; the interposing member 6; the electrically driven rotation range restricting mechanism, and the buffering mechanism, respectively.

The gear case 11, as shown in FIG. 2, FIG. 3, FIG. 9, and FIG. 10, is formed in a sectional recessed shape of which one side (a lower side) is closed and the other side (an upper side) is opened. In other words, in the gear case 11, there is provided a housing portion 18 formed in a sectional recessed shape of which the shaft holder 9 side is closed and the cove 12 side is opened. An insert hold 19 is provided at a closed portion of the gear case 11. The shaft 10 is inserted into the insert hole 19. As a result, the gear case 11 is rotatably mounted on the shaft 10 so as to be rotatable around the rotational center O-O of the shaft 10.

Figure 9:
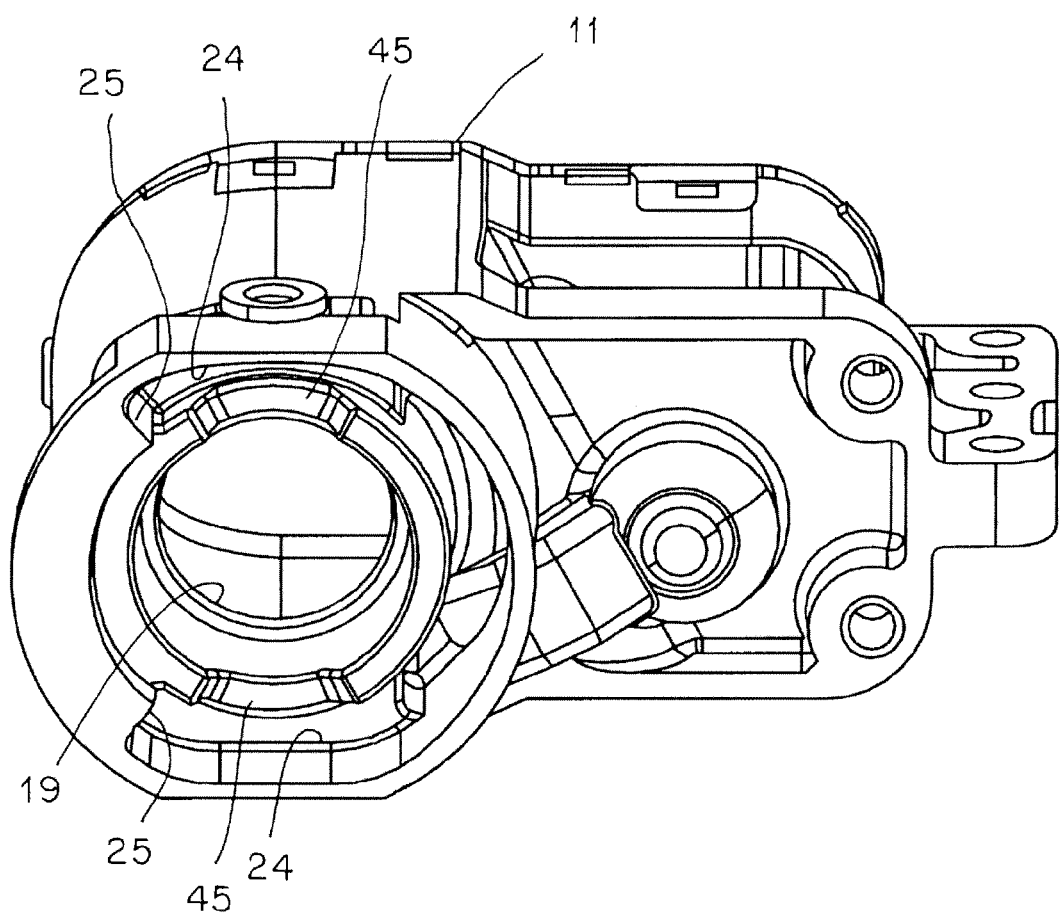
FIG. 9 is a perspective view showing a state in which a casing is seen from an oblique lower side, similarly.
Figure 10:
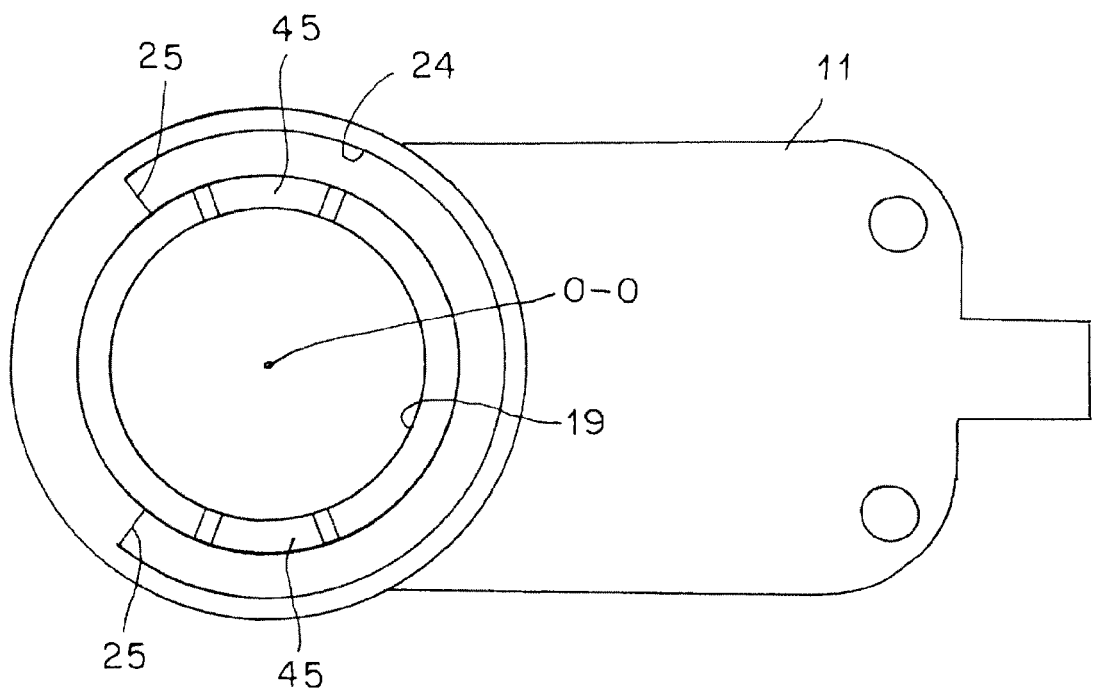
FIG. 10 is a view taken in the direction indicated by the arrow X in FIG. 2, showing a bottom face of the casing, similarly.
Figure 11:
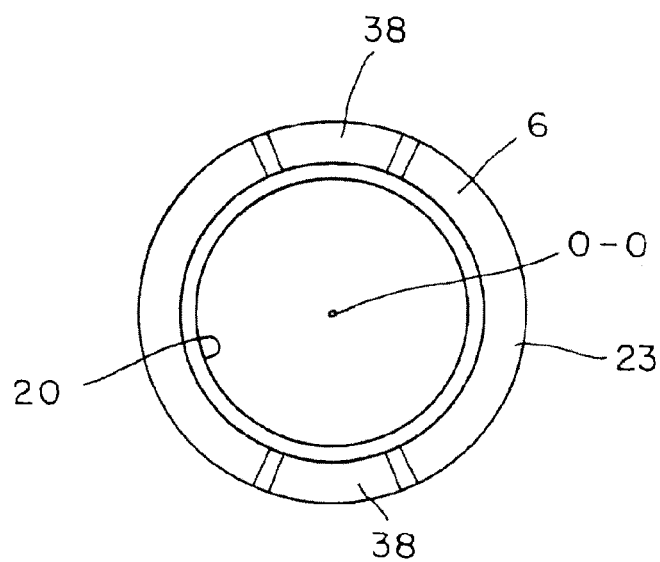
FIG. 11 is a view taken in the direction indicated by the arrow in FIG. 2, showing a plane of the interposing member, similarly.

As shown in FIG. 2 to FIG. 5, an arc shaped stopper protrusive portion 21 around the rotational center O-O of the shaft 10 is integrally provided on a top face of the shaft holder 9. Stopper faces 22 are provided on both end faces of the stopper protrusive portion 21, respectively. On the other hand, as shown in FIG. 9 and FIG. 10, an arc shaped guide groove 24 around the rotational center O-O of the shaft 10 is provided on a bottom face of the gear case 11. Stopper faces 25 are provided on both end faces of the guide groove 24, respectively.

The stopper protrusive portion 21 of the shaft holder 9 is engaged with the guide groove 24 of the gear case 11. The stopper protrusive portion 21 and the guide groove 24 configure a guide member serve as a guide when the gear case 11 rotates around the rotational center O-O of the shaft 10 relative to the shaft holder 9, in other words, as shown in FIG. 1, when the mirror assembly 4 rotates between a use location A and a storage location B relative to the base 2 and between the use position A and a forward tilting location C backward (in the clockwise direction seen from the top) or forward (in the counterclockwise direction seen from the top). In FIG. 1, reference numeral E designates a backside of a vehicle and reference numeral F designates a foreside of the vehicle.

In addition, the stopper face 22 of the stopper protrusive portion 21 and the stopper face 25 of the guide groove 24 configures a stopper member in which, before the mirror assembly 4 rotates and abuts against the door D in the clockwise direction seen from the top or in the counterclockwise direction seen from the top, the stopper face 22 of the stopper protrusive portion 21 and the stopper face 25 of the guide groove 24 abut against each other and then rotation of the mirror assembly 4 is restricted, the stopper member serving as a stopper for avoiding abutment of the mirror assembly 4 against the door D.

Figure 2:
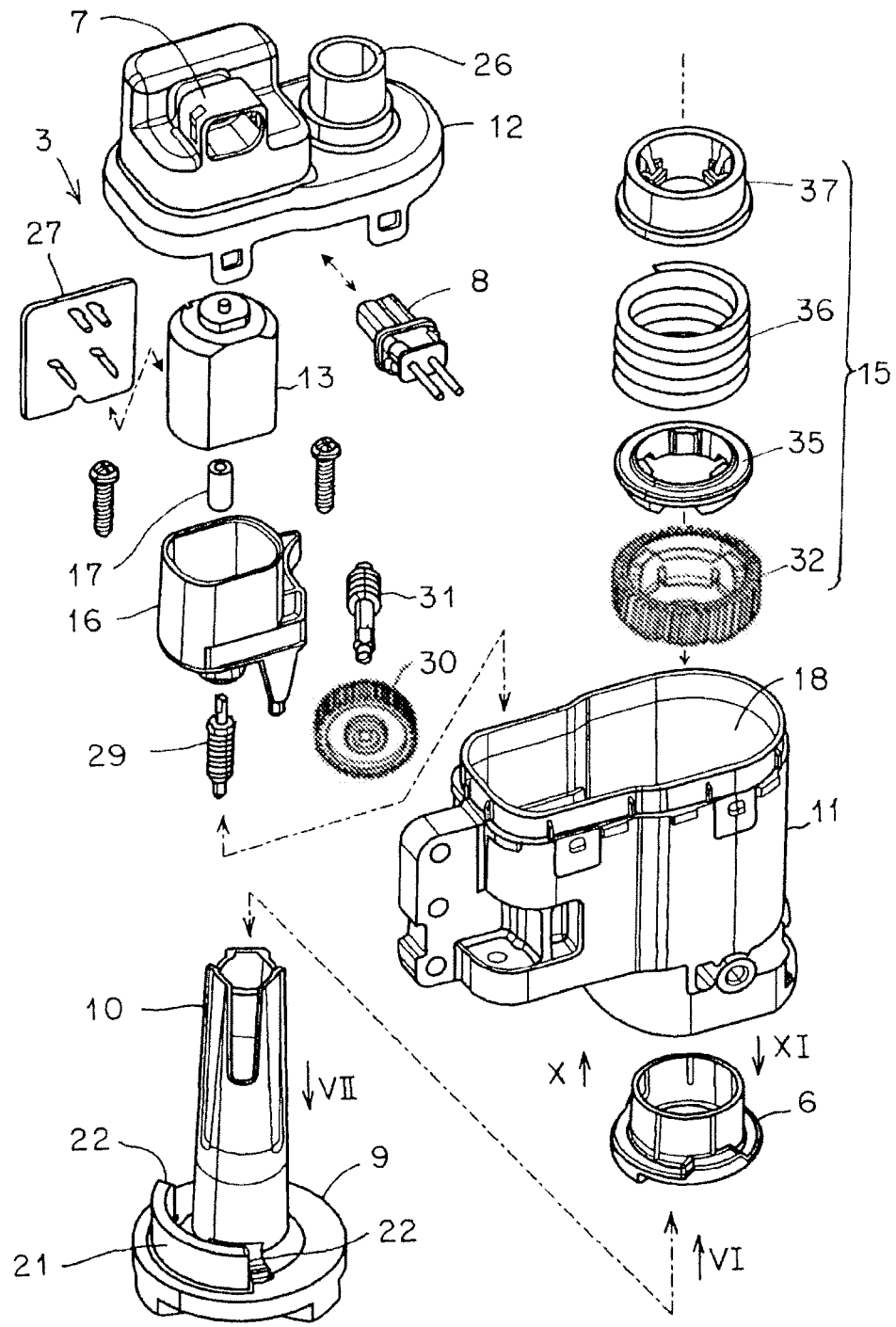
FIG. 2 is an exploded perspective view showing an electrically driven storage unit, similarly.
Figure 3:
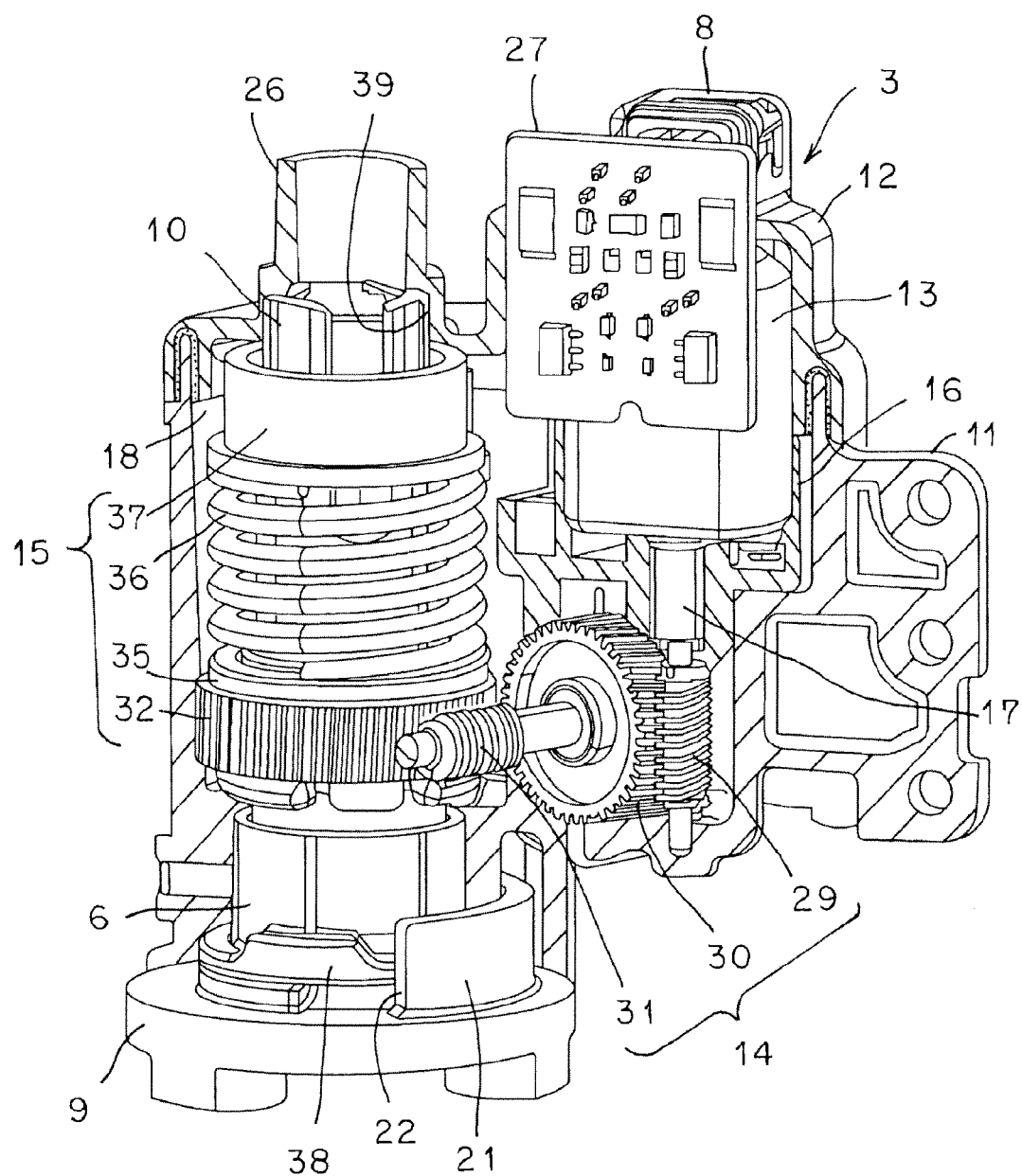
FIG. 3 is a perspective view showing an electrically driven storage unit with a casing being partially cut out, similarly.
Figure 4:
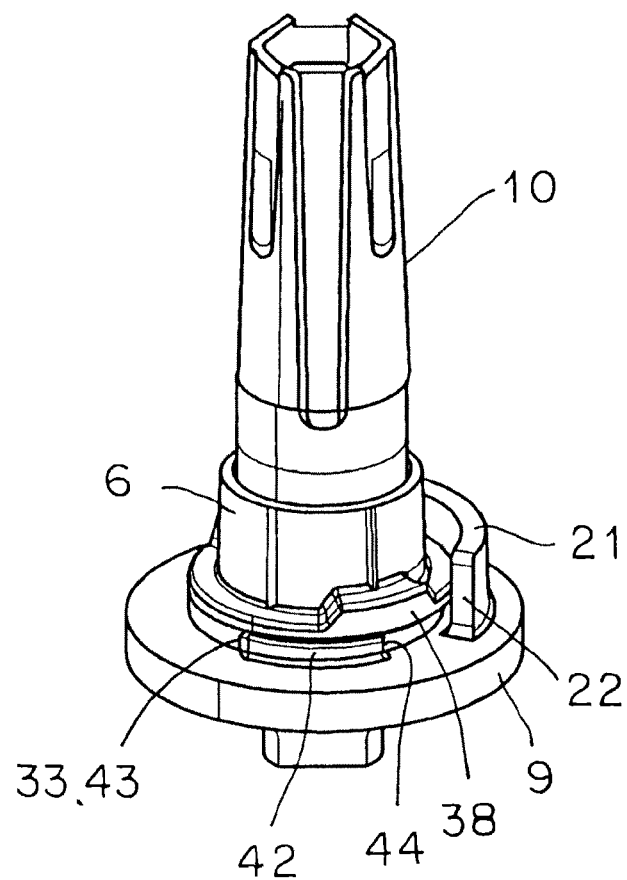
FIG. 4 is a perspective view showing a state in which an interposing member is assembled with a shaft holder, similarly.

The cover 12, as shown in FIG. 2 and FIG. 3, is formed in a sectional inverted recessed shape of which one side (an upper side) is closed and the other side (a lower side) is opened. In other word, on the cover 12, there is provided a housing portion 18 formed in a sectional inverted recessed shape of which one side, i.e., the gear case 11 side is opened and the other side is opened. On the cover 12, a harness insert cylinder portion 26 which communicates with the shaft 10 formed in a hollow shape is integrally provided.

In addition, a socket portion 7 is provided at the cover 12. On the socket portion 7, a connector 8 which is electrically connected to a power supply (a battery) side, although not shown, electrically intermittently connects thereto and is mounted in a mechanically detachable manner. A board 27 is mounted on the socket portion 7. The board 27 is electrically connected to the motor 13. A switch circuit for controlling the drive or stoppage of the motor 13 is packaged on the board 27. As a result, the motor 13 is electrically connected to the connector 8 via the board 27 and the socket portion 7.

The cover 12 is engagingly fixed to the outside of an opening rim of the housing portion 18 of the gear case 11. In the housing portion 18 inside the gear case 11 and the cover 12, the motor 3, the deceleration mechanism 14, the clutch mechanism 15, the bearing member 16, the interposing member 6, the electrically driven rotation range restricting mechanism, the buffering mechanism, and the board 27 are fixedly housed by means of screws or the like.

In addition, on the cover 12, an insert hole 39 is provided so as to communicate with the harness insert cylinder portion 26. The shaft 10 is inserted into the insert hole 39. As a result, the cover 12 is mounted on the shaft 10, together with the gear case 11, so as to be rotatable around the rotational center O-O of the shaft 10.

The deceleration mechanism 14 and the clutch mechanism 15, a respective one of which serves as the rotation force transmission mechanism, as shown in FIG. 2 and FIG. 3, are the ones that are housed in the housing portion 18 of the gear case 11 and the cover 12, that are provided between an output shaft (not shown) and the shaft 10, of the motor 13, and that transmit a rotation force of the motor 13 to the shaft 10. The motor 13, the deceleration mechanism 14, and the clutch mechanism 15, a respective one of which serves as the rotation force transmission mechanism, are the ones that are electrically driven relative to the shaft 10 to rotate the mirror assembly 4 around the rotational center O-O of the shaft 10.

The deceleration mechanism 14 is comprised of: a first worm gear 29 which serves as a first step gear; a helical gear 30 which serves as a second step gear engaging with the first worm gear 29; a second worm gear 31 which serves as a third step gear; and a clutch gear 32 which serves as a final step gear with which the second worm gear 31 engages.

The first worm gear 29 is rotatably borne on the gear case 11 and the bearing member 16. The first worm gear 29 is linked with an output shaft of the motor 13 via a joint 17. The helical gear 30 is rotatably borne on the bearing member 16. The second worm gear 31 is rotatably borne on the gear case 11 and the bearing member 16. The helical gear 30 and the second worm gear 31 are linked with each other integrally rotatably.

The clutch mechanism 15 is provided with the clutch gear 32, a clutch holder 35, a spring 36, and a push nut 37. The clutch mechanism 15 is configured by sequentially engaging the clutch gear 32, the clutch holder 35, and the spring 36 with the shaft 10, locking the push nut 37 with the shaft 10, and then, establishing the spring 36 in a compressed state. The clutch gear 32 and the clutch holder 35 are linked with each other in a intermittently connectable manner. The second worm gear 31 of the deceleration member 14 and the clutch gear 32 of the clutch mechanism 15 engage with each other, whereby a rotation force of the motor 13 is transmitted to the shaft 10.

The clutch gear 32 and the clutch holder 35 configure the clutch mechanism 15. The clutch gear 32 is mounted on the shaft 10 so as to be rotatable around the rotational center O-O of the shaft 10 and to be movable in an axial direction. The clutch holder 35 is mounted on the shaft 10 in an engaged state so as to disable rotation and to be movable in an axial direction. As shown in FIG. 2, FIG. 13, and FIG. 15 to FIG. 18, a plurality of, i.e., three mountain-shaped clutch protrusive portions 49 and three valley-shaped clutch portions 41 are provided at equal intervals on a face which is mutually opposite to the clutch gear 32 and the clutch holder 35, i.e., on one face (an upper face) side of the clutch gear 32 and one face (a bottom face) side of the clutch holder 40. When the clutch protrusive portion 40 and the clutch recessed portion 41 are established in an engaged state, the clutch gear 32 and the clutch holder 35 are in a continuous state (a non-disengaged state or a connected state); or when the clutch protrusive portion 40 and the clutch recessed portion 41 are in a disengaged state, the clutch gear 32 and the clutch holder 35 are in a discontinuous state (an engaged state or a disconnected state). The clutch mechanism 15 is disallowed to disengage with an electrically driven rotation force of the motor 13 and the rotation force transmission mechanism (the deceleration mechanism 14 and the clutch mechanism 15) and disengages with a force which is equal to or greater than the electrically driven rotation force so as to be able to rotate the mirror assembly 4 relative to the shaft 10.

Among the clutch members, the other face (a bottom face) side of the clutch gear 32 abuts against one face (a top face) of a bottom part of the gear case 11 directly or via a washer (not shown). On the other hand, among the clutch members, the other face (a top face) side of the clutch holder 35 directly abuts against the spring 36.

Figure 6:
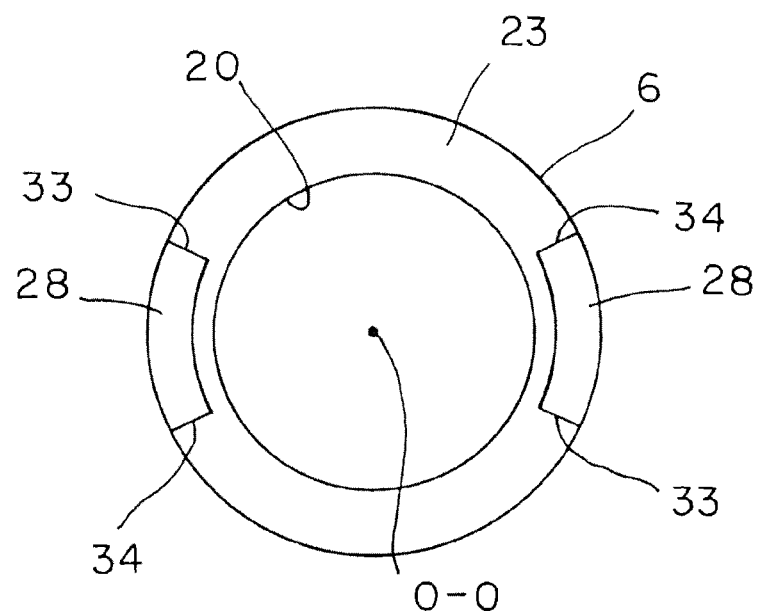
FIG. 6 is a view in the direction indicated by the arrow VI in FIG. 2, showing a bottom face of the interposing member, similarly.
Figure 8:
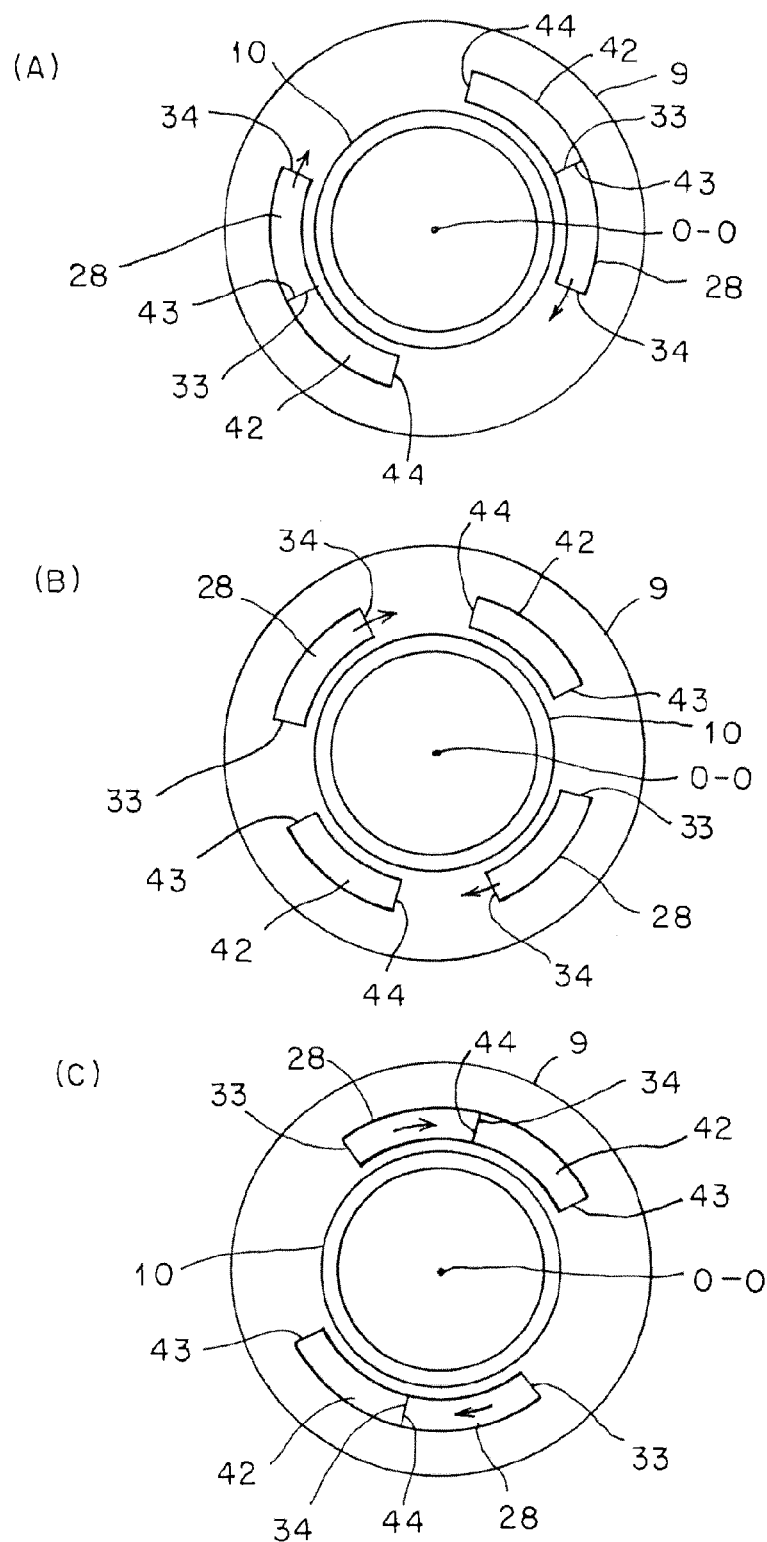
FIG. 8A-C is an explanatory plan view showing a state of actuation of the electrically driven rotation range restricting mechanism which is provided at a respective one of the interposing member and the shaft holder, similarly.

The interposing member 6 is provided between the shaft holder 9 and the gear case 11. The interposing member 6 is comprised of an inexpensive member with its low friction and frictional wear proof property, for example, a POM (polyacetal or an acetal resin) or a PPS (polyphenylene sulfide). The interposing member 6 is formed in a hollow-shaped cylindrical shape having a through hole 20 through which the shaft 10 is to be inserted and having a jaw portion 23 at one end part (a lower end part). The interposing member 6 is mounted on the shaft 10 so as to be rotatable around the rotational center O-O of the shaft 10. As shown in FIG. 6 and FIG. 8, on one face (a bottom face) of the jaw portion 23 of the interposing member 6, two arc-shaped protrusive portions 28 around the rotational center O-O of the shaft 10 are integrally provided at equal intervals. Abutment faces 33, 34 of the electrically driven rotation range restricting mechanism are provided on both end faces of the arc-shaped protrusive portion 28, respectively. In addition, on the other face (a top face) of the jaw portion 23 of the interposing member 6, a plurality of trapezoidal engagement protrusive portions 38 which serve as engagement portions of the buffering mechanism, two pieces in this example, are integrally provided at equal intervals on a circumference around the rotational center O-O of the shaft 10.

Figure 7:
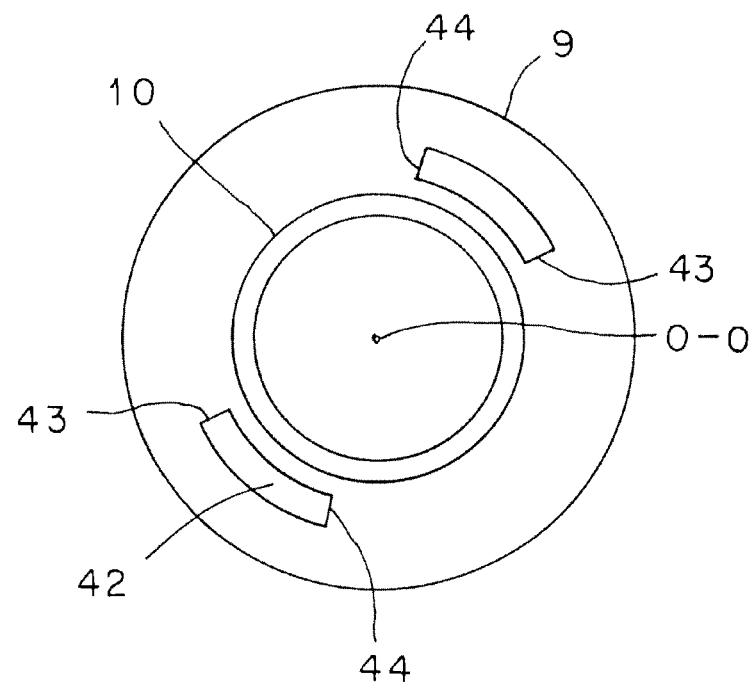
FIG. 7 is a view in the direction indicated by the arrow VII in FIG. 2, showing a plane of the shaft holder, similarly.

The shaft holder 9 and the shaft 10 are comprised of a member with its high rigidity, for example, a die cast or a resin. As shown in FIG. 7 and FIG. 8, on a top face of the shaft holder 9, two arc-shaped protrusive portions 42 around the rotational center O-O of the shaft 10 are integrally provided at equal intervals in correspondence with the arc-shaped protrusive portion 28 of the interposing member 6. On both end faces of the arc-shaped protrusive portion 42, the abutment faces 43, 44 of the electrically driven rotation range restricting mechanism are provided in correspondence with the abutment faces 33, 34 of the interposing member 6, respectively.

The gear case 11 is comprised of a member with its high rigidity, for example, a resin containing nylon or a glass fiber or a carbon fiber. On the other face (a bottom face) of a bottom part of the gear case 11, a plurality of trapezoidal engagement recessed portions 45 which serve as engagement portions of the buffering mechanism, two pieces in this example, are integrally provided at equal intervals in correspondence with the engagement protrusive portions 38 of the interposing member 6 on a circumference around the rotational center O-O of the shaft 10.

The electrically driven rotation range restricting mechanism is a mechanism for restricting a range of the electrically driven rotation of a mirror assembly. In other words, the electrically driven rotation range restricting mechanism is comprised of the abutment faces 33, 34, 43, 44 which are provided at the interposing member 6 and the shaft holder 9, and is a mechanism in which the abutment face 33 or 34 of the interposing member 6 and the abutment face 43 or 44 of the shaft holder 9 abut against each other, whereby the interposing member 6 is fixed to the shaft holder 9 and then the electrically driven rotation range of the mirror assembly 4 is restricted. The electrically driven rotation range, as shown in FIG. 1, is a range between a use location A and a storage location B. As a result, when one abutment face 33 of the interposing member 6 and one abutment face 43 of the shaft holder 9 abut against each other, the mirror assembly 4 is positioned in the use location A. Alternatively, when the other abutment face 34 of the interposing member 6 and the other abutment face 44 of the shaft holder 9 abut against each other, the mirror assembly 4 is positioned in the storage location B.

The buffering mechanism is a mechanism for rotating the mirror assembly 4 for the sake of buffering. In other words, the buffering mechanism is comprised of an engagement protrusive portion 38 and an engagement recessed portion 45 which are provided at the interposing member 6 and the gear case 11. This buffering mechanism is a mechanism in which, when the engagement protrusive portion 38 of the interposing member 6 and the engagement recessed portion 45 of the gear case 11 are disallowed to disengage from each other with the electrically driven rotation force, the interposing member 6 and the gear case 11 rotate together around the rotational center O-O of the shaft 10 relative to the shaft 10 and the shaft holder 9 in the electrically driven rotation range (a range between a use position A and a storage position B) and a force which is equal to or greater than the electrically driven rotation force has been applied in a forward F direction of a vehicle, the engagement protrusive portion 38 of the interposing member 6 and the engagement recessed portion 45 of the gear case 11 disengage from each other, and further, the clutch mechanism 15 is disengaged (a clutch protrusive portion 40 of the clutch gear 32 and a clutch recessed portion 41 of the clutch holder 35 are disengaged from each other, and the gear case 11 rotates in the counterclockwise direction seen from the top, around the rotational center O-O of the shaft 10 relative to the shaft 10 and the shaft holder 9.

(Description of Function)

The electrically driven storage type door mirror device 1 in this exemplary embodiment is made of the constituent elements as described above. Hereinafter, functions of the device will be described.

First, a description will be given with respect to a case in which a mirror assembly 4 that is positioned in a use location A is electrically driven to be rotated and stored in a storage location B, as shown in FIG. 1. When the mirror assembly 4 is established in a state in which it is positioned in the use location A (in a set state or in a use state), a clutch mechanism 15 is in a state shown in FIG. 13 (A), FIG. 15, and FIG. 17, in addition an electrically driven rotation range restricting mechanism is established in a state shown in FIG. 5 (A), FIG. 8 (A), FIG. 12 (A), and FIG. 13 (A), and further a buffering mechanism is established in a state shown in FIG. 12 (A) and FIG. 13 (A).

Figure 13:
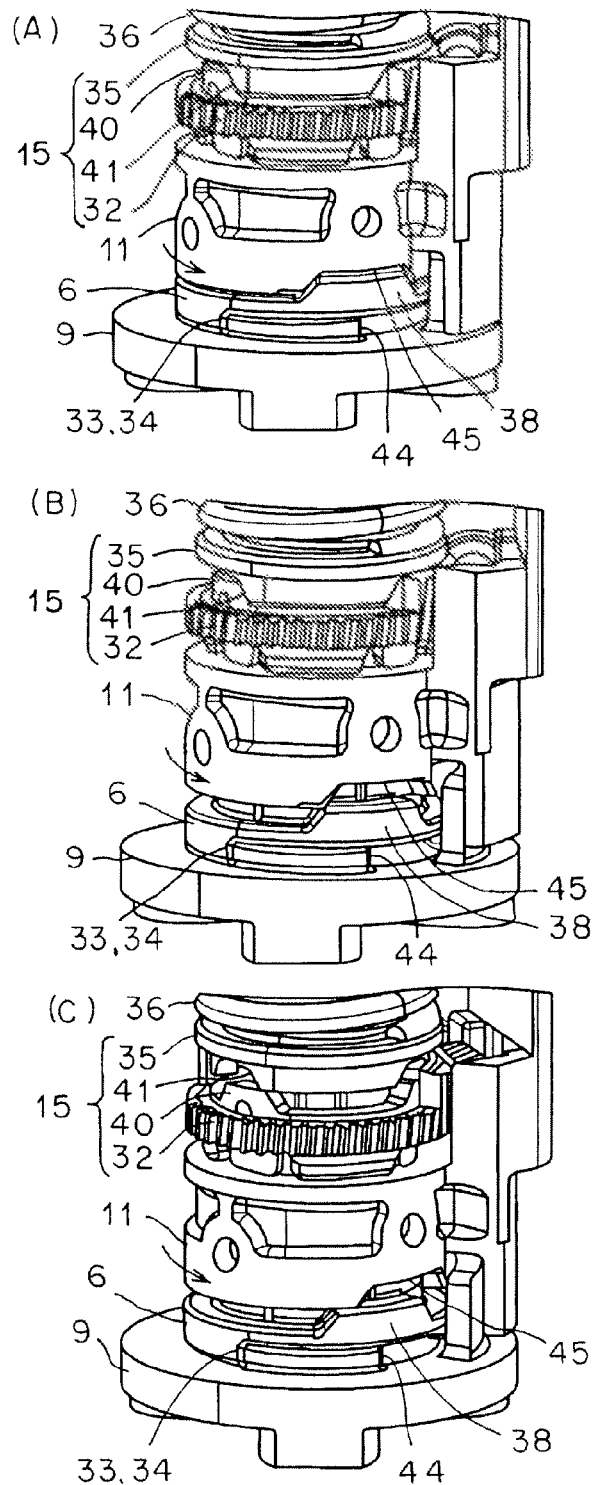
FIG. 13A-C is an explanatory view showing: a state of actuation of the electrically driven rotation range restricting mechanism which is provided at a respective one of the interposing member and the shaft holder; and a state of actuation of a clutch mechanism, similarly.
Figure 15:
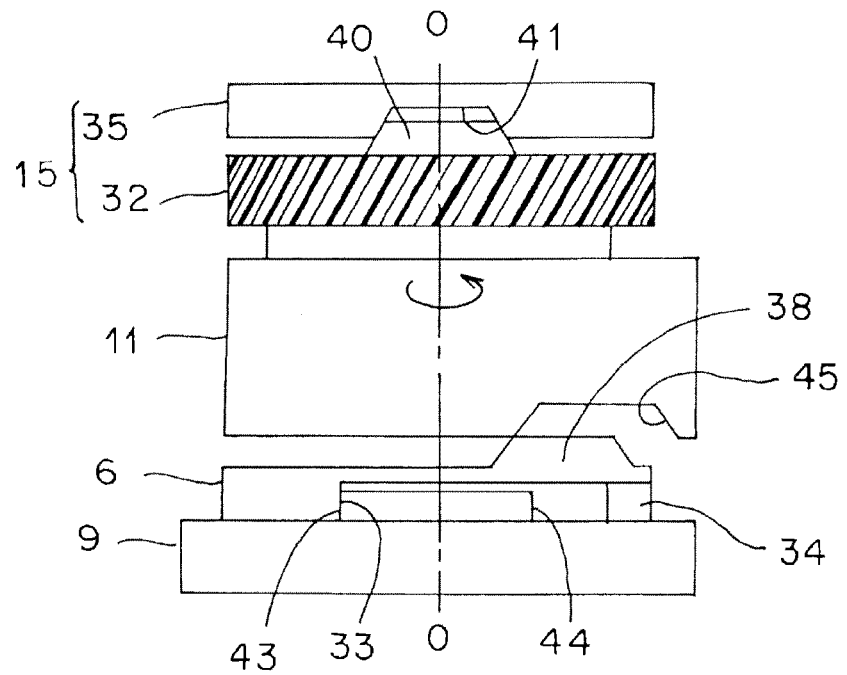
FIG. 15 is an explanatory plan view showing a state in which an engagement portion of the interposing member and an engagement portion of the casing disengage from each other at the time of buffering to ensure forward tilting, similarly.
Figure 17:
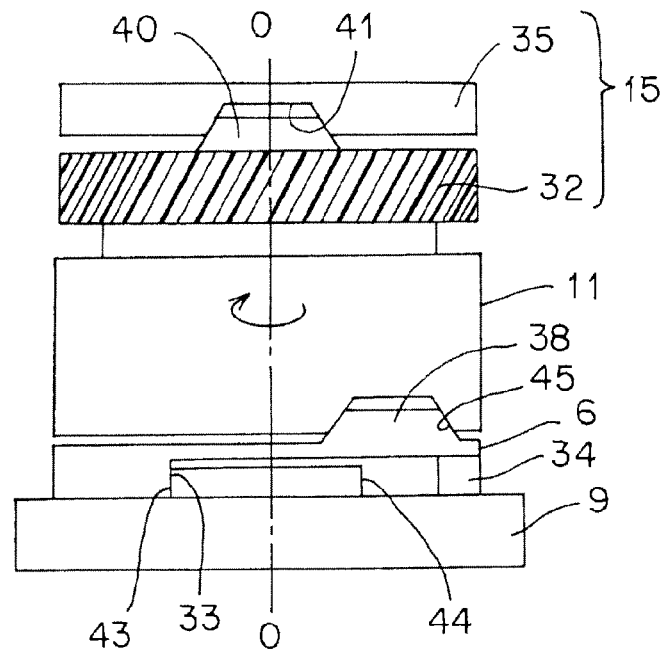
FIG. 17 is an explanatory plan view showing a state in which the interposing member and the casing of the buffering mechanism are about to rotate at the time of buffering for backward tilting, similarly.

In other words, the clutch mechanism 15, as shown in FIG. 13 (A), FIG. 15, and FIG. 17, is established in a state in which a clutch protrusive portion 40 of a clutch gear 32 and a clutch recessed portion 41 of a clutch holder 35 are in an engaged state, so that the clutch gear 32 and the clutch holder 35 are in continuous state. Therefore, the clutch gear 32 is a state in which rotation is disabled relative to a shaft 10, together with the clutch holder 35.

Figure 5:
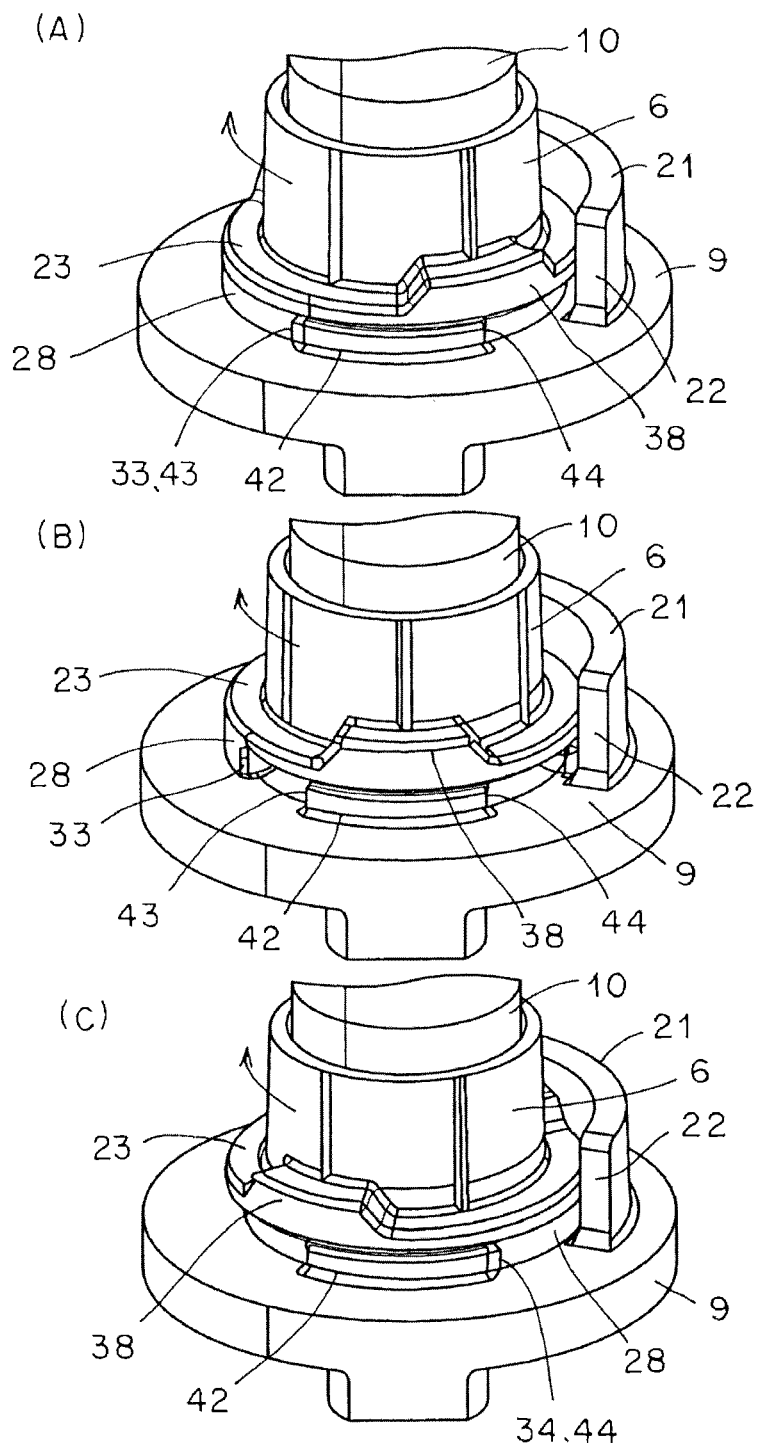
FIG. 5A-C is an explanatory view showing a state of actuation of an electrically driven rotation range restricting mechanism provided at a respective one of the interposing member and the shaft holder, similarly.
Figure 12:
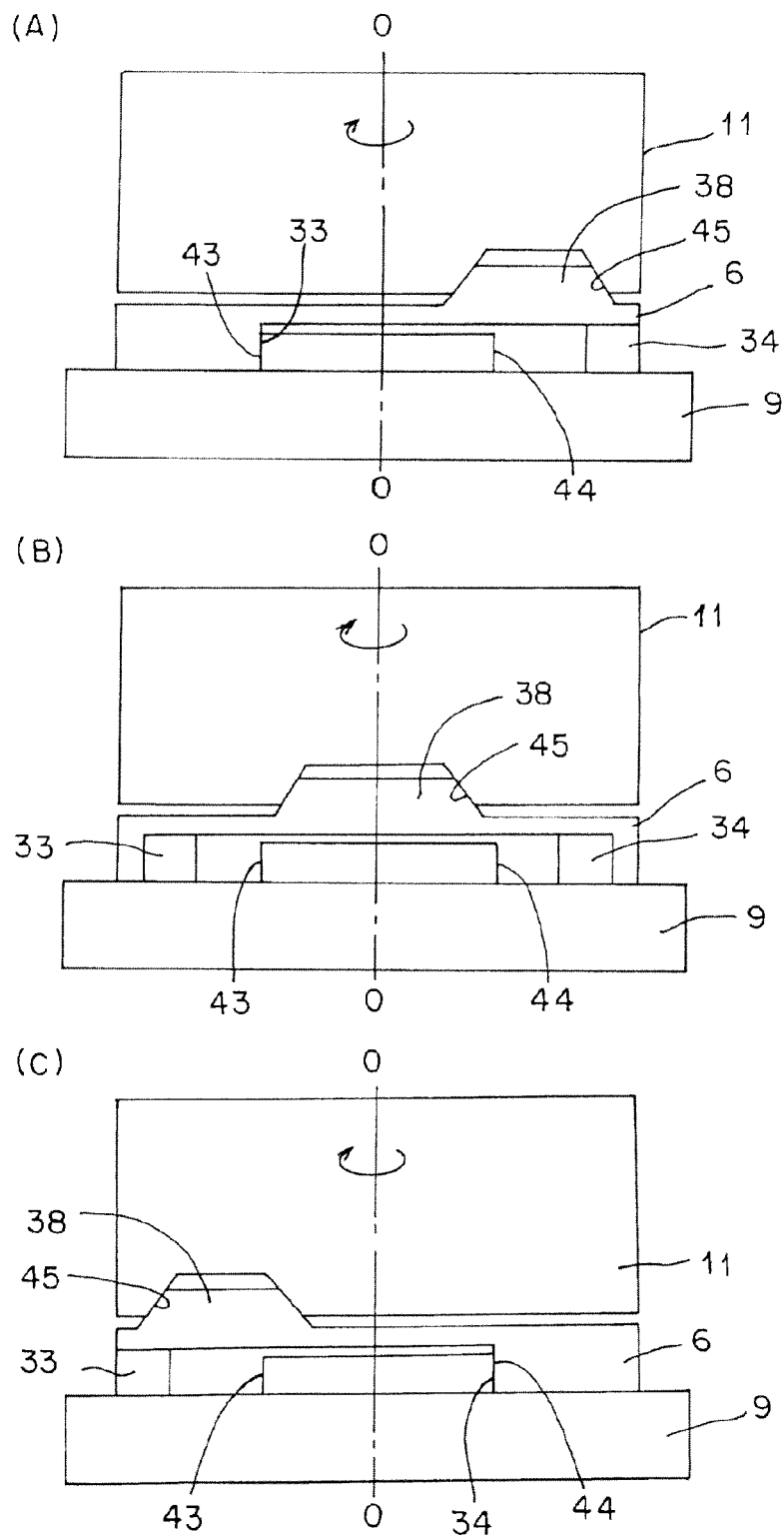
FIG. 12A-C is an explanatory plan view showing a state of actuation of the electrically driven rotation range restricting mechanism which is provided at a respective one of the interposing member and the shaft holder and a state of actuation of a buffering mechanism which is provided between the interposing member and the casing, similarly.

In addition, the electrically driven rotation range restricting mechanism, as shown in FIG. 5 (A), FIG. 8 (A), FIG. 12 (A), and FIG. 13 (A), is established in a state in which one abutment face 30 of the interposing member 6 and one abutment face 43 of the shaft holder 9 abut against each other. As a result, the interposing member 6 is established in a state in which it is fixed to the shaft holder 9.

Further, the buffering mechanism, as shown in FIG. 12 (A) and FIG. 13 (A), is established in a state in which an engagement protrusive portion 38 of the interposing member 6 and an engagement recessed portion 45 of the gear case 11 engage with each other. As a result, the interposing member 6 and the gear case 11 are established in an integrated state.

In this set state (a use state), a switch (not shown) in an automobile room is operated and then power is fed to a motor 13 via a connector 8, a socket portion 7, and a board 27 so as to thereby drive the motor 13. Then, a rotation force of the motor 13 is transmitted to the clutch gear 32 that is fixed to the shaft 10 via an output shaft and a deceleration mechanism 14. At this time, the clutch gear 32 is established in a state in which rotation is disabled relative to the shaft 10, together with the clutch holder 35, so that a second worm gear 31 of the deceleration mechanism 14 rotates around a rotational center O-O of the shaft 10 with the clutch gear 32 serving as a fixing gear. By means of this rotation, the mirror assembly 4 having the electrically driven storage unit 3 incorporated therein, as shown in FIG. 1, rotates in the clockwise direction seen from the top from a use location A to a storage location around the rotational center O-O of the shaft 10.

When this mirror assembly 4 rotates in the clockwise direction seen from the top from the use location A to the storage location B, the gear case 11 of the electrically driven storage unit 3 rotates in the clockwise direction seen from the top (in the direction indicated by the solid arrow in FIG. 12) relative to the shaft 10. Concurrently with this rotation, the interposing member 6 in which the engagement protrusive portion 38 engages with the engagement recessed portion 45 of the gear case 11 rotates in the clockwise direction seen from the top (in the direction indicated by the solid arrow in FIG. 5, FIG. 8, and FIG. 12) similarly relative to the shaft holder 9. In other words, one face (a bottom face) of a protrusive portion 28 of the interposing member 6 rotates (slips, slides, or slidably moves) on a top face of the shaft holder 9. As a result, as shown in FIG. 5 (B), FIG. 8 (B), and FIG. 12 (B), one abutment face 33 of the interposing member 6 is spaced from one abutment face 43 of the shaft holder 9.

When the mirror assembly 4 is positioned in the storage location B, the other abutment face 34 of the interposing member 6 abuts against the other abutment face 44 of the shaft holder 9, as shown in FIG. 5 (C), FIG. 8 (C), and FIG. 12 (C). As a result, the interposing member 6 is fixed to the shaft holder 9 and then rotation of the interposing member 6 stops. In addition, rotation of the gear case 11 in which the engagement recessed portion 45 engages with the engagement protrusive portion 38 of the interposing member 6 stops similarly.

At the same time as this rotation, a value of a current (an actuation current) which is supplied to the motor 13 rises and reaches a predetermined value; a switch circuit of the board 27 is actuated; and then, current supply to the motor 13 is interrupted. As a result, the mirror assembly 4 stops and is positioned in the storage location B that serves as a predetermined location shown in FIG. 1.

Next, a description will be given with respect to a case in which the mirror assembly 4 that is positioned in the storage location B is electrically driven to rotate and is returned to the use location A, as shown in FIG. 1. When the mirror assembly 4 is established in a state in which it is positioned in the storage location B (in a storage state), the clutch mechanism 15 is established in a state shown in FIG. 13 (A), FIG. 15, and FIG. 17, in addition the electrically driven rotation range restricting mechanism is established in a state shown in FIG. 5 (C), FIG. 8 (C), and FIG. 12 (C), and further the buffering mechanism is established in a state shown in FIG. 12 (C).

In other words, the clutch mechanism 15 is established in a connected state, as in its set state, so that the clutch gear 32 is established in a state in which rotation is disabled relative to the shaft 10, together with the clutch holder 35. In addition, the electrically driven rotation range restricting mechanism is established in a state in which the other abutment face 34 of the interposing member 6 and the other abutment face 44 of the shaft holder 9 abut against each other, so that the interposing member 6 is established in a state in which it is fixed to the shaft holder 9. Further, the buffering mechanism is established in a state in which the engagement protrusive portion 38 of the interposing member 6 engages with the engagement recessed portion 45 of the gear case 11, so that the interposing member 6 and the gear case 11 are established in an integrated state.

In this storage state, a switch (not shown) in an automobile room is operated to drive the motor 13. Then, a rotation force of the motor 13 is transmitted to the clutch gear 32 that is established in a state in which rotation is disabled via the deceleration mechanism 14. In this manner, the mirror assembly 4 having the electrically driven storage unit 3 incorporated therein, as shown in FIG. 1, rotates in the counterclockwise direction seen from the top from the storage location B to the use location A around the rotational center O-O of the shaft 10.

When this mirror assembly 4 rotates in the counterclockwise direction seen from the top from the storage location B to the use location A around the rotational center O-O of the shaft 10, the gear case 11 rotates in the counterclockwise direction seen from the top (in the direction opposite to that indicated by the solid arrow in FIG. 12) similarly relative to the shaft 10. Concurrently with this rotation, the interposing member 6 in which the engagement protrusive portion 38 engages with the engagement recessed portion 45 of the gear case 11 rotates in the counterclockwise direction seen from the top (in the direction opposite to that indicated by the solid arrow in FIG. 5, FIG. 8, and FIG. 12) similarly relative to the shaft holder 9. In other words, a bottom face of the protrusive portion 28 of the interposing member 6 rotates (slips, slides, or slidably moves) on the top face of the shaft holder 9. As a result, as shown in FIG. 5 (B), FIG. 8 (B), and FIG. 12 (B), the other abutment face 34 of the interposing member 6 is spaced from the other abutment face 44 of the shaft holder 9.

When the mirror assembly 4 is positioned in the use location A, one abutment face 33 of the interposing member 6 abuts against one abutment face 43 of the shaft holder 9, as shown in FIG. 5 (A), FIG. 8 (A), and FIG. 12 (A). As a result, the interposing member 6 is fixed to the shaft holder 9 and then rotation of the interposing member 6 stops. In addition, rotation of the gear case 11 in which the engagement recessed portion 45 engages with the engagement protrusive portion 38 of the interposing member 6 stops similarly.

At the same time as this rotation, a value of a current (an actuation current) which is supplied to the motor 13 rises and reaches a predetermined value; a switch circuit of the board 27 is actuated; and then current supply to the motor 13 is interrupted. As a result, the mirror assembly 4 stops and is positioned in the use location A that serves as a predetermined location shown in FIG. 1.

Further, a description will be given with respect to a case in which the mirror assembly 4 that is positioned in the use location A is caused to tilt in a forward tilting location C for the sake of buffering, as shown in FIG. 1. When the mirror assembly 4 is a state in which it is positioned in the use location A (in a set state or in a use state), the clutch mechanism 15 is established in a state shown in FIG. 13 (A), FIG. 15, and FIG. 17, in addition the electrically driven rotation range restricting mechanism is established in a state shown in FIG. 5 (A), FIG. 8 (A), FIG. 12 (A), and FIG. 13 (A), and further the buffering mechanism is established in a state shown in FIG. 12 (A) and FIG. 13 (A).

In other words, the clutch mechanism 15 is established in a connected state, so that the clutch gear 32 is established in a state in which rotation is disabled relative to the shaft 10, together with the clutch holder 35. In addition, the electrically driven rotation range restricting mechanism is established in a state in which one abutment face 33 of the interposing member 6 and one abutment face 43 of the shaft holder 9 abut against each other, so that the interposing member 6 is established in a state in which it is fixed to the shaft holder 9. Further, the buffering mechanism is established in a state in which the engagement protrusive portion 38 of the interposing member 6 and the engagement recessed portion 45 of the gear case 11 engage with each other, so that the interposing member 6 and the gear case 11 are established in an integrated state.

In this set state (a use state), a force in the counterclockwise direction seen from the top, the force being equal to or greater than an electrically driven rotation force exerted by the motor 13 and the deceleration mechanism 14 (a manual force and a force when something abuts against the mirror assembly 4), is applied to the mirror assembly 4 that is positioned in the use location A. Then, the gear case 11 that is mounted on the mirror assembly 4 is about to rotate in the counterclockwise direction (in the direction indicated by the solid arrow in FIG. 13, FIG. 15, and FIG. 16). At this time, as shown in FIG. 13, FIG. 15, and FIG. 16, one abutment face 33 of the interposing member 6 abuts against one abutment face 43 of the shaft holder 9, so that the interposing member 6 is fixed to the shaft holder 9 and cannot rotate in the counterclockwise direction seen from the top.

Therefore, as shown in FIG. 13 (B) and FIG. 15, the engagement recessed portion 45 of the gear case 11 runs on the engagement protrusive portion 38 of the interposing member 6 and then the engagement protrusive portion 38 of the interposing member 6 and the engagement recessed portion 45 of the gear case 11 first disengage from each other. At this time, the gear case 11 (including the cover 12, the motor 13, the deceleration mechanism 14, the bearing member 16, the clutch gear 32, and the clutch holder 35) moves (rises) against a spring force of a spring 36.

Figure 14:
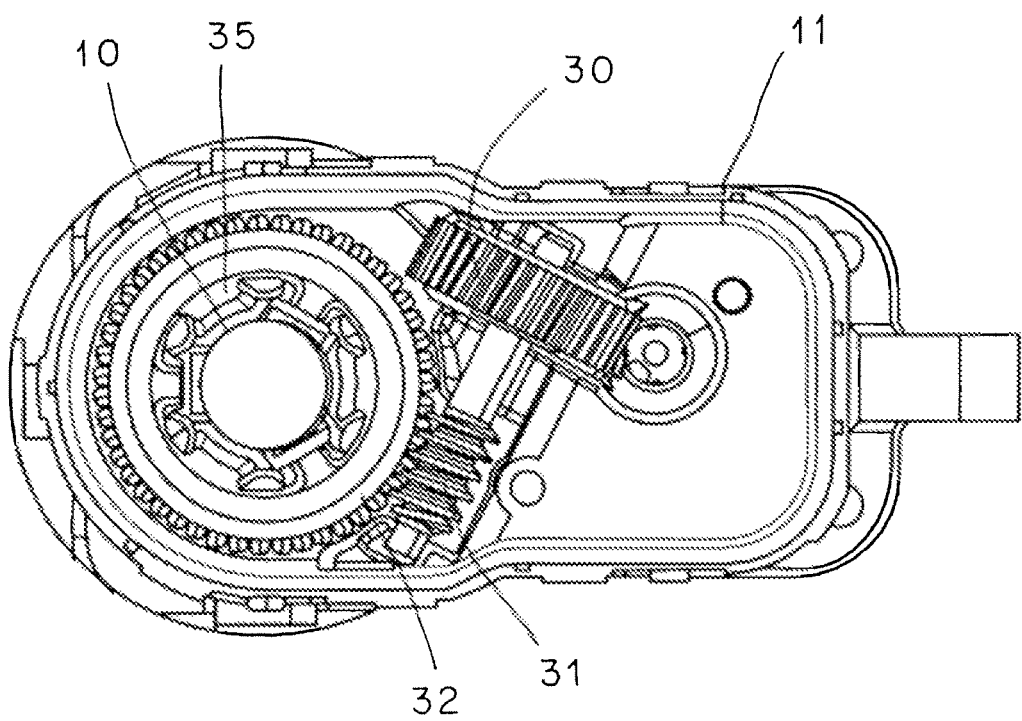
FIG. 14 is a plan view showing an electrically driven storage unit in a state in which a cover is removed, similarly.

Then, the gear case 11 is further about to rotate in the counterclockwise direction seen from the top. Subsequently, as shown in FIG. 14, a backlash between the clutch gear 32 and a second worm gear 31 is clogged, a gap in the thrust direction of the second worm gear 31 is clogged, and then, an engagement gap between the shaft 10 and the clutch holder 35 is clogged.

Figure 16:
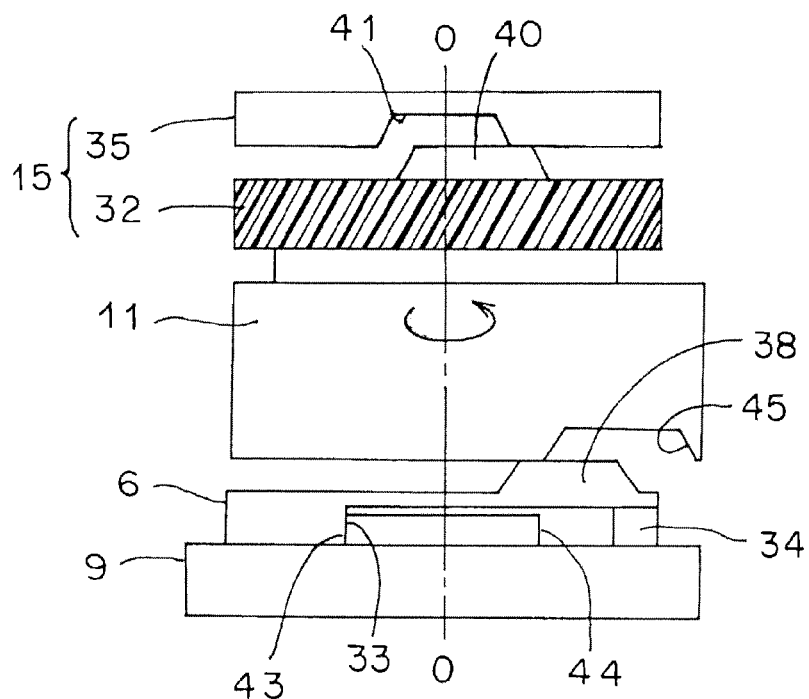
FIG. 16 is an explanatory plan view showing a state in which a clutch mechanism disengages at the time of buffering to ensure forward tiling, similarly.

The clutch holder 35 is engaged with the shaft 10 so as to disable rotation, so that as shown in FIG. 13 (C) and FIG. 16, the clutch protrusive portion 40 of the clutch gear 32 at the gear case 11 side runs on the clutch recessed portion 41 of the clutch holder 35 at the fixing side of the shaft 10 and then the clutch protrusive portion 40 of the clutch gear 32 and the clutch recessed portion 41 of the clutch holder 35 disengage from each other. At this time, the clutch holder 35 moves (rises) against the spring force of the spring 36.

As a result, the gear case 11 (including the cover 12, the motor 13, the deceleration mechanism 14, the bearing member 16, and the clutch gear 32) rotates in the counterclockwise direction seen from the top. In this manner, as shown in FIG. 1, the mirror assembly rotates in the counterclockwise direction seen from the top from the use location A to the forward tilting location C and then is positioned in the forward tilting location C at a time point when one stopper face 22 of a stopper protrusive portion 21 of the shaft holder 9 has abutted against one stopper face 25 of a guide groove 24 of the gear case 11.

Then, as shown in FIG. 1, the mirror assembly 4 that is positioned in the forward tilting location C is caused to rotate in the clockwise direction seen from the top with a force which is greater than an electrically driven rotation force. Subsequently, the gear case 11 that is mounted to the mirror assembly 4 (including the cover 12, the motor 13, the deceleration mechanism 14, the bearing member 16, and the clutch gear 32) rotates in the clockwise direction seen from the top (in the direction opposite to that indicated by the solid arrow in FIG. 13, FIG. 15, and FIG. 16), so that as shown in FIG. 1, the mirror assembly 4 rotates in the clockwise direction seen from the top from the forward tilting location C to the use location A.

Then, the clutch protrusive portion 40 of the clutch gear 32 and the clutch recessed portion 41 of the clutch holder 35 first engage with each other and then the clutch mechanism 15 is established in a connected state. Subsequently, the engagement protrusive portion 38 of the interposing member 6 and the engagement recessed portion 45 of the gear case 11 engage with each other and then the interposing member 6 and the gear case 11 are established in an integrated state. As a result, as shown in FIG. 1, the mirror assembly 4 is positioned in the use location A.

Further, a description will be given with respect to a case in which the mirror assembly 4 that is positioned in the use position A is caused to tilt in the storage location B, as shown in FIG. 1. When the mirror assembly 4 is established in a state in which it is positioned in the use location A (in a set state or use state), the clutch mechanism 15 is established in a state shown in FIG. 13 (A), FIG. 15, and FIG. 17, in addition the electrically driven rotation range restricting mechanism is established in a state shown in FIG. 5 (A), FIG. 8 (A), FIG. 12 (A), and FIG. 13 (A), and further the buffering mechanism is established in a state shown in FIG. 12 (A) and FIG. 13 (A).

In other words, the clutch mechanism 15 is established in a connected state, so that the clutch gear 32 is established in a state in which rotation is disabled relative to the shaft 10, together with the clutch holder 35. In addition, the electrically driven rotation range restricting mechanism is established in a state in which one abutment face 33 of the interposing member 6 and one abutment face 43 of the shaft holder 9 abut against each other, so that the interposing member 6 is established in a state in which it is fixed to the shaft holder 9. Further, the buffering mechanism is established in a state in which the engagement protrusive portion 38 of the interposing member 6 and the engagement recessed portion 45 of the gear case 11 engage with each other, so that the interposing member 6 and the gear case 11 are established in an integrated state.

Figure 18:
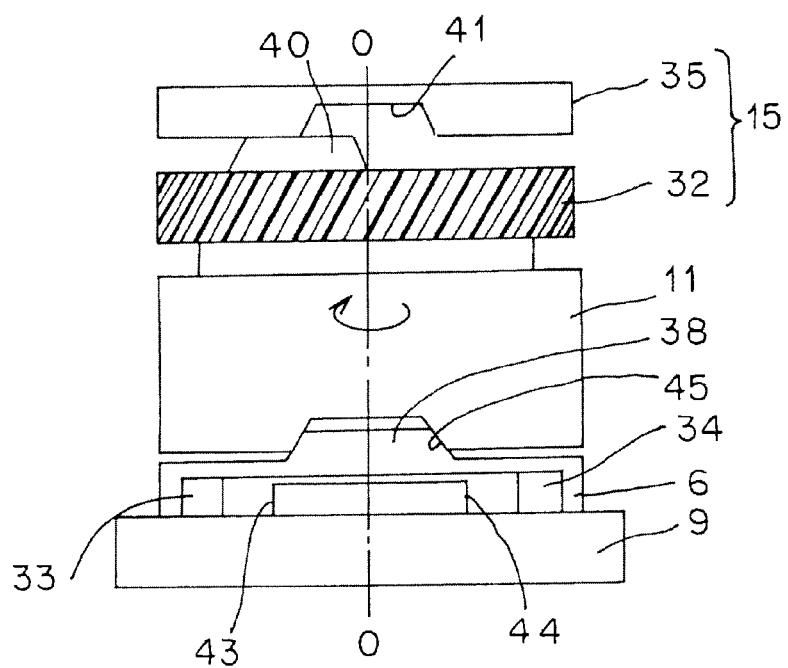
FIG. 18 is an explanatory plan view showing a state in which a clutch mechanism disengages at the time of buffering to ensure backward tilting, similarly.

In this set state (a use state), a force in the counterclockwise direction seen from the top, the force being equal to or greater than an electrically driven rotation force (a manual force and a force when something abuts against the mirror assembly 4), is applied to the mirror assembly 4 that is positioned in the use location A. Then, the gear case 11 that is mounted on the minor assembly 4 is about to rotate in the clockwise direction seen from the top (in the direction indicated by the solid arrow in FIG. 17 and FIG. 18). At this time, as shown in FIG. 17 and FIG. 18, one abutment face 33 of the interposing member 6 abuts against one abutment face 43 of the shaft holder 9, whereas the other abutment face 34 of the interposing member 6 is disallowed to abut against the other abutment face 44 of the shaft holder 9, so that the interposing member 6 is not fixed to the shaft holder 9 in the clockwise direction seen from the top and can rotate in this direction (in the clockwise direction seen from the top).

Therefore, as shown in FIG. 17, in a state in which the engagement protrusive portion 38 of the interposing member 6 and the engagement recessed portion 45 of the gear case 11 engage with each other, the interposing member 6 and the gear case 11 are about to rotate in the clockwise direction seen from the top relative to the shaft holder 9. At this time, the clutch holder 35 is engaged with the shaft 10 so as to disable rotation, so that as shown in FIG. 18, the clutch protrusive portion 40 of the clutch gear 32 at the gear case 11 side runs on the clutch recessed portion 41 of the clutch holder 35 at the fixing side of the shaft 10 and then the clutch protrusive portion 40 of the clutch gear 32 and the clutch recessed portion 41 of the clutch holder 35 disengage from each other. At this time, the clutch holder 35 moves (rises) against the spring force of the spring 36.

As a result, the gear case 11 (including the cover 12, the motor 13, the deceleration mechanism 14, the bearing member 16, and the clutch gear 32) rotate in the clockwise direction seen from the top. In this manner, as shown in FIG. 1, the mirror assembly 4 rotates in the clockwise direction seen from the top from the use location A to the storage location B and then is positioned in the storage location B at a time point when the other stopper face 22 of the stopper protrusive portion 21 of the shaft holder 9 abuts against the other stopper face 25 of the guide groove 24 of the gear case 11.

Then, as shown in FIG. 1, the mirror assembly 4 that is positioned in the storage location B is caused to rotate in the counterclockwise direction seen from the top with a force which is greater than an electrically driven rotation force. Subsequently, the gear case 11 that is mounted on the mirror assembly 4 (including the cover 12, the motor 13, the deceleration mechanism 14, the bearing member 16, and the clutch gear 32) rotates in the counterclockwise direction seen from the top (in the direction opposite to that indicated by the solid arrow in FIG. 17 and FIG. 18), so that as shown in FIG. 1, the mirror assembly 4 rotates in the counterclockwise direction seen from the top from the storage location B to the use location A.

Afterwards, the clutch protrusive portion 40 of the clutch gear 32 and the clutch recessed portion 41 of the clutch holder 35 are first engage with each other and then the clutch mechanism 15 is established in a connected state. As a result, as shown in FIG. 1, the mirror assembly 4 is positioned in the use location A.

(Description of Advantageous Effect(s))

An electrically driven storage type door mirror device 1 in the exemplary embodiment is made of the constituent elements and functions as described above. Hereinafter, the advantageous effects of the device will be described.

The electrically driven storage type door mirror device 1 in the exemplary embodiment is configured in such a manner that an electrically driven rotation range restricting mechanism for restricting a range of electrically driven rotation of a mirror assembly 4 and a buffering mechanism for rotating the mirror assembly 4 for the sake of buffering are separated from each other. In other words, the electrically driven rotation range restricting mechanism is configured with an interposing member 6 and a shaft holder 9, whereas the buffering mechanism is configured with the interposing member 6 and a gear case 11. Therefore, with the electrically driven storage type door mirror device 1 in this exemplary embodiment, in an electrically driven rotation range, the interposing member 6 and the gear case 11 rotate relative to the shaft holder 9 together, and when a force which is equal to or greater than an electrically driven rotation force has acted thereon, the gear case 11 rotates relative to the interposing member 6 and the shaft holder 9 for the sake of buffering. As a result, with the electrically driven storage type door mirror device 1 in the exemplary embodiment, the interposing member 6 is interposed between the shaft holder 9 and the gear case 11, and rotates relative to the shaft holder 9 or relative to the gear case 11, so that the interposing member 6 does not need to be comprised of a member with its high rigidity, and can be comprised of an inexpensive member with its low friction and frictional wear proof property, whereas the shaft holder 9 and the gear case 11 can be comprised of a member with its high rigidity.

Further, with the electrically driven storage type door mirror device 1 in the exemplary embodiment, in an interrelationship between the interposing member 6 and the shaft holder 9, the interposing member 6 rotates relative to the shaft holder 9 and the interposing member 6 is fixed to the shaft holder 9 by means of abutment (facial abutment) between the abutment faces 33, 34 of the interposing member 6 and the abutment faces 43, 44 of the shaft holder 9; and therefore, unlike the conventional vehicle outside mirror device described previously, a cutting proof member with which a case top is covered is disallowed to run on a stand top at the time of rotation in a forward tilting enable location. In other words, the interposing member 6 is disallowed to rotate relative to the shaft holder 9 when the mirror assembly 4 rotates for the sake of buffering; a buffering rotation force (which serves as a force of disengaging the engagement protrusive portion of the interposing member 6 and the engagement recessed portion 45 of the gear case 11 from each other, and which serves as a buffering torque) is disallowed to act between the interposing member 6 and the shaft holder 9; and a material for the shaft holder 9 and the shaft 10 is disallowed to affect durability of a rotation force at the time of buffering. Therefore, with the electrically driven storage type door mirror device 1 in the exemplary embodiment, no frictional wear occurs between the interposing member 6 and the shaft holder 9, so that the shaft holder 9 and the shaft 10 can be comprised of a resin member with its high rigidity or a metal member (a die cast), and a material type can be selectively employed in accordance with a request for a vehicle type. In other words, as a material for the shaft holder 9 and the shaft 10, a resin member with its low cost and high rigidity can be selected in the case of a small-sized vehicle outside mirror device or a metal material can be selected in the case of a large-sized vehicle outside mirror device such as an RV vehicle. On the other hand, parts other than the shaft holder 9 and the shaft 10, i.e., the interposing member 6 and the gear case 11 (including the cover 12, the motor 13, the deceleration mechanism 14, the bearing member 16, the clutch gear 32, and the clutch holder 35) can be shared. As a result, support for a request for a vehicle type can be achieved and manufacturing cost can be reduced.

Moreover, in the vehicle outside mirror device 1 according to the first aspect of the present invention, the electrically driven rotation range of the mirror assembly 4 can be adjusted and set for each vehicle type by changing an opening angle of an abutment face 43, 44 of a shaft holder 9 in an electrically driven rotation restricting mechanism and an opening angle of a stopper face 22 of a stopper protrusive portion 21. As a result, in the vehicle outside mirror device 1 according to the first aspect of the present invention, parts other than the shaft holder 9 and the shaft 10, i.e., the interposing member 6 and the gear case 11 (including the cover 12, the motor 13, the deceleration mechanism 14, the bearing member 16, the clutch gear 32, and the clutch holder 35) can be shared, so that support for a request for a vehicle type can be achieved and manufacturing cost can be reduced.

Further, with the electrically driven storage type door mirror device 1 in the exemplary embodiment, the engagement protrusive portion 38 of the interposing member 6 in the buffering mechanism and the engagement recessed portion 45 of the gear case 11 engage with each other and the abutment faces 33, 34 of the interposing member 6 of the electrically driven rotation range restricting mechanism and the abutment faces 43, 44 of the shaft holder 9 abut against each other, so that the gear case 11 is assembled with the shaft holder 9 via the interposing member 6 without any backlash, whereby movement of the mirror of the mirror assembly 4 can be restricted to its required minimum.

In addition, with the electrically driven storage type door mirror device 1 in the exemplary embodiment, the interposing member 6 is comprised of an inexpensive member with its low friction and frictional wear proof property, for example, a POM (polyacetal or an acetal resin) or a PPS (polyphenylene sulfide), so that a rotation (slipping, sliding, or sliding movement) between the interposing member 6 and the shaft holder 9 and a rotation (slipping, sliding, or sliding movement) between the interposing member 6 and the gear case 11 become smooth and stable. As a result, with the electrically driven storage type door mirror device 1 in the exemplary embodiment, distortion in electrically driven rotation force and buffering rotation force lessens, so that a design strength of parts of the electrically driven storage unit 3 can be reduced. For example, the thickness is decreased or a material grade can be degraded, and manufacturing cost of the entire electrically driven storage unit 3 can be reduced.

Further, with the electrically driven storage type door mirror 1 in the exemplary embodiment, the interposing member 6 is comprised of a member with its low friction and frictional wear proof property, so that a frictional wear between the engagement protrusive portion 38 of the interposing member 6 and the engagement recessed portion 45 of the gear case 11 can be restricted to its required minimum. As a result, the electrically storage type door mirror 1 in the exemplary embodiment can restrict lowering of a buffer rotation force to its required minimum. In this manner, it is possible to prevent a failure that the mirror assembly 4 tilts more forwardly than the use location A due to the lowering of the buffering rotation force.

Moreover, with the electrically driven storage type door mirror 1 in the exemplary embodiment, the interposing member 6 is comprised of a member with its low friction and frictional wear proof property, so that even if a lubricating member such as grease applied to the interposing member 6, the shaft holder 9, and the gear case 11 to take countermeasure against frictional wear becomes short with an elapse of time (at the time of lack of grease), frictional coefficients of the interposing member 6, the shaft holder 9, and the gear case 11 less change, so that even after extended use thereof, the performance of a buffering rotation force is less degraded.

(Description of Examples Other Than Exemplary Embodiment)

In the foregoing exemplary embodiment, an electrically driven storage type door mirror device has been described. However, the present invention can also be applied to a vehicle outside mirror device other than the electrically driven storage type door mirror. For example, the present invention can be applied to a vehicle outside mirror device of electrically driven storage type such as a vehicle fender mirror device of electrically driven storage type.

In addition, in the foregoing exemplary embodiment, a clutch protrusive portion 40 is provided at a clutch gear 32 and a clutch recessed portion 41 is provided at a clutch holder 35. However, in the present invention, a clutch recessed portion may be provided at a clutch gear and a clutch protrusive portion may be provided at a clutch holder, or alternatively, a clutch protrusive portion and a clutch recessed portion may be provided at a clutch gear and a clutch recessed portion and a clutch protrusive portion may be provided at a clutch holder.

Further, in the foregoing exemplary embodiment, an engagement protrusive portion 38 is provided at an interposing member 6 and an engagement recessed portion 45 is provided at a gear case 11. However, in the present invention, an engagement recessed portion may be provided at an interposing member and an engagement protrusive portion may be provided at a gear case, or alternatively, an engagement protrusive portion and an engagement recessed portion may be provided at an interposing member and an engagement recessed portion and an engagement protrusive portion may be provided at a gear case.

Furthermore, in the foregoing exemplary embodiment, two arc-shaped protrusive portion 28 are provided on a bottom face of an interposing member 6 and two arc-shaped protrusive portions 42 are provided on a top face of a shaft holder 9, thereby improving strength, which is preferable. However, in the present invention, the number of arc-shaped protrusive portions 28 and the number of arc-shaped protrusive portions 42 are not limitative in particular.

What is claimed is:

1. A vehicle outside mirror device in which a mirror assembly is rotatably mounted on a vehicle body via an electrically driven storage unit and a base, the electrically driven storage unit comprising:
a shaft holder which is fixed to the base;
a shaft which is provided at the shaft holder;
a casing which is rotatably mounted on the shaft and on which the mirror assembly is mounted;
a motor and a rotation force transmission mechanism, which are housed in the casing, for electrically driving the mirror assembly to rotate relative to the shaft;
a clutch mechanism which is provided at the rotation force transmission mechanism, and which is disallowed to disengage therefrom with an electrically driven rotation force of the motor and the rotation force transmission mechanism and disengages therefrom with a force which is equal to or greater than the electrically driven rotation force so as to cause the mirror assembly to be rotatable relative to the shaft;
an electrically driven rotation range restricting mechanism for restricting a range of the electrically driven rotation of the mirror assembly; and
a buffering mechanism causing the mirror assembly to rotate for a sake of buffering, wherein:
an interposing member is provided between the shaft holder and the casing;
the electrically driven rotation range restricting mechanism is comprised of: an abutment face which is provided on an abutment face of a respective one of the interposing member and the shaft holder; and an abutment face of the interposing member and an abutment face of the shaft holder abut against each other, whereby the interposing member is fixed to the shaft holder and the electrically driven rotation range of the mirror assembly is restricted;
the buffering mechanism is comprised of an engagement portion which is provided at a respective one of the interposing member and the casing, the buffering mechanism serving as a mechanism in which: with the electrically driven rotation force (which serves as a force causing a mirror assembly to rotate relative to a shaft in an electrically driven rotation range and which serves as an electrically driven torque), an engagement portion of the interposing member and an engagement portion of the casing are disallowed to disengage from each other, the interposing member and the casing rotating together relative to the shaft and the shaft holder in the electrically driven rotation range; and with a force which is equal to or greater than the electrically driven rotation force, the engagement portion of the interposing member and the engagement potion of the casing disengage from each other, and further, the clutch mechanism is disengaged for the casing to rotate relative to the shaft and the shaft holder.

2. The vehicle outside mirror device according to claim 1, wherein
the interposing member is comprised with a member of a low friction and a frictional wear proof property.

* * * * *